United States Patent [19]

Abe et al.

[11] Patent Number: 5,143,981

[45] Date of Patent: Sep. 1, 1992

[54] RESIN COMPOSITION

[75] Inventors: Hiroomi Abe; Kenji Nagaoka; Takashi Sanada, all of Chiba, Japan

[73] Assignee: Sumitomo Chemical Company, Limited, Osaka, Japan

[21] Appl. No.: 624,305

[22] Filed: Dec. 7, 1990

[30] Foreign Application Priority Data

Dec. 8, 1989 [JP] Japan .................................. 1-320241
Dec. 8, 1989 [JP] Japan .................................. 1-320242

[51] Int. Cl.$^5$ .............................................. C08L 71/12
[52] U.S. Cl. ...................................... 525/391; 525/905
[58] Field of Search ..................... 525/391, 392, 905

[56] References Cited

U.S. PATENT DOCUMENTS

| | | | |
|---|---|---|---|
| 3,379,792 | 4/1968 | Finholt | 525/397 |
| 3,522,326 | 7/1970 | Bostick et al. | 525/391 |
| 4,315,086 | 2/1982 | Ueno et al. | 525/391 |
| 4,600,741 | 7/1986 | Aycock et al. | 524/139 |
| 4,654,405 | 3/1987 | Jalbert et al. | 525/391 |
| 4,659,760 | 4/1987 | van der Meer | 525/905 |
| 4,659,763 | 4/1987 | Gallucci et al. | 525/68 |
| 4,732,937 | 3/1989 | Sybert | 525/92 |
| 4,797,453 | 1/1989 | Taubitz et al. | 525/391 |
| 4,870,123 | 9/1989 | Nelson | 524/490 |

FOREIGN PATENT DOCUMENTS

| | | |
|---|---|---|
| 0046040 | 2/1982 | European Pat. Off. . |
| 0236593 | 9/1987 | European Pat. Off. . |
| 59-59724 | 4/1984 | Japan . |
| 59-86653 | 5/1984 | Japan . |
| 62-236853 | 2/1987 | Japan . |
| 63-108060 | 5/1988 | Japan . |
| 63-113071 | 5/1988 | Japan . |
| 1-139642 | 6/1989 | Japan . |
| 88/08433 | 11/1988 | PCT Int'l Appl. . |
| 85/05372 | 12/1985 | World Int. Prop. O. . |
| 87/00540 | 1/1987 | World Int. Prop. O. . |
| 88/06173 | 8/1988 | World Int. Prop. O. . |

*Primary Examiner*—James J. Seidleck
*Assistant Examiner*—Thomas Hamilton, III

[57] ABSTRACT

A resin composition superior in impact resistance is provided which comprises (a) a polyphenylene ether and (b) an unsaturated aliphatic hydrocarbon, and, if necessary, (c) a polyolefin resin. These resin compositions are obtained by melt kneading the components (a) and (b) or the components (a), (b) and (c).

2 Claims, No Drawings

RESIN COMPOSITION

BACKGROUND OF THE INVENTION

The present invention relates to a resin composition and more particularly, to a polyphenylene ether resin composition excellent in impact properties and a thermoplastic resin composition excellent in impact resistance which comprises polyphenylene ether resin and polyolefin resin as main constitutional resin components.

Polyphenylene ether resins are useful resins having excellent mechanical and electrical properties and high heat resistance, but have the defects of low impact strength and inferior processability and solvent resistance. Therefore, at present, utilization of polyphenylene ether resins per se is severely limited.

For improving the low impact strength, proposals have been made to incorporate other resins or rubbers into polyphenylene ether resins.

However, according to these proposed processes, impact strength can be improved, but the excellent heat resistance of polyphenylene ether resins is inevitably damaged.

On the other hand, polyolefin resins have the advantages of cheapness and low specific gravity in addition to excellent processability and solvent resistance and are widely practically used as various shaped articles and films. However, polyolefin resins have the defect of low heat resistance and this defect hinders further extension of use of polyolefin resins.

Under the circumstances, it is easy for one skilled in the art to infer to blend polyphenylene ether resin with polyolefin resin which have respective excellent properties, thereby to produce a resin composition having the advantages of both resins and some proposals have already been made (Japanese Patent Kokoku No. 42-7069 and Japanese Patent Kokai No. 59-100159).

However, affinity between polyphenylene ether resin and polyolefin resin is originally very low and hence it is difficult to obtain resin composition excellent in mechanical properties by blending them and the above proposed resin compositions are not satisfactory in mechanical properties.

SUMMARY OF THE INVENTION

An object of the present invention is to provide a polyphenylene ether resin composition improved in impact strength keeping the excellent heat resistance of polyphenylene ether resin.

Another object of the present invention is to provide a resin composition excellent in mechanical properties, especially impact strength which has as main constitutional resin components a polyphenylene ether resin characterized in heat resistance and a polyolefin resin characterized in solvent resistance and economical point.

As a result of intensive research conducted by the inventors in an attempt to attain the above objects, it has been found that a composition comprising a polyphenylene ether resin and a specific unsaturated aliphatic hydrocarbon has excellent heat resistance and impact strength. Thus, the present invention has been accomplished.

That is, the present invention relates to a polyphenylene ether resin composition, characterized by comprising:

(a) a polyphenylene ether resin and
(b) an unsaturated aliphatic hydrocarbon.

Furthermore, the inventors have found that the above specific unsaturated aliphatic hydrocarbon has also the effect to improve compatibility between polyphenylene ether and polyolefin resin and have accomplished the present invention.

That is, the present invention further relates to a resin composition, characterized by comprising:

(a) a polyphenylene ether resin,
(b) an unsaturated aliphatic hydrocarbon, and
(c) a polyolefin resin.

DESCRIPTION OF THE INVENTION

The polyphenylene ether resin used in the present invention has recurring structural unit represented by the formula:

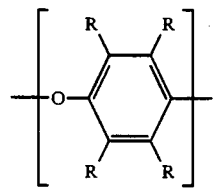

wherein ether oxygen atom in one unit links to benzene ring in the next adjacent unit and a plurality of R each represents a monovalent substituent selected from the group consisting of a hydrogen atom, a halogen atom, a hydrocarbon group containing a halohydrocarbon group having at least two carbon atoms between a halogen atom and a phenyl ring, a hydrocarbon oxy group and halohydrocarbon oxy group having at least two carbon atoms between a halogen atom and a phenyl ring.

Typical examples of polyphenylene ether are the following ones and analogues thereof.

Poly(2,6-dimethyl-1,4-phenylene) ether,
Poly(2,6-diethyl-1,4-phenylene) ether,
Poly(2-methyl-6-ethyl-1,4-phenylene) ether,
Poly(2-methyl-6-propyl-1,4-phenylene) ether,
Poly(2,6-dipropyl-1,4-phenylene) ether,
Poly(2-ethyl-6-propyl-1,4-phenylene) ether,
Poly(2,6-dibutyl-1,4-phenylene) ether,
Poly(2,6-dipropenyl-1,4-phenylene) ether,
Poly(2,6-dilauryl-1,4-phenylene) ether,
Poly(2,6-diphenyl-1,4-phenylene) ether,
Poly(2,6-dimethoxy-1,4-phenylene) ether,
Poly(2,6-diethoxy-1,4-phenylene) ether,
Poly(2-methoxy-6-ethoxy-1,4-phenylene) ether,
Poly(2-ethyl-6-stearyloxy-1,4-phenylene) ether,
Poly(2,6-dichloro-1,4-phenylene) ether,
Poly(2-methyl-6-phenyl-1,4-phenylene) ether,
Poly(2,6-dibenzyl-1,4-phenylene) ether,
Poly(2-ethoxy-1,4-phenylene) ether,
Poly(2-chloro-1,4-phenylene) ether,
Poly(2,5-dibromo-1,4-phenylene) ether.

Moreover, there are included copolymers such as copolymer of 2,6-dimethylphenol and 2,3,6-trimethylphenol, copolymer of 2,6-dimethylphenol and 2,3,5,6-tetramethylphenol and copolymer of 2,6-diethylphenol and 2,3,6-trimethylphenol.

Processes for producing these polyphenylene ether resins are known and are disclosed, for example, in U.S. Pat. Nos. 3,306,874, 3,306,875, 3,257,357, and 3,257,358, Japanese Patent Kokoku No. 52-17880, and Japanese Patent Kokai No. 50 - 51197.

Furthermore, polyphenylene ether resins used in the present invention include modified polyphenylene ethers such as those which are prepared by grafting styrene monomers (for example, styrene, p-methylstyrene, and α-methylstyrene) on polyphenylene ether defined above.

Polyphenylene ether resins preferable for attaining the object of the present invention are those which have alkyl substituents in two ortho-positions in respect to ether oxygen atom and copolymers of 2,6-dialkylphenol and 2,3,6-trialkylphenol.

Among them, poly(2,6-dimethyl-1,4-phenylene) ether is especially preferred.

Molecular weight of polyphenylene ether resins differs in its suitable range depending on their object and the suitable range cannot be simply determined, but generally is 0.1–0.7 dl/g, more preferably 0.2–0.6 dl/g in terms of intrinsic viscosity measured in chloroform at 30° C.

The unsaturated aliphatic hydrocarbons used in the present invention are aliphatic hydrocarbons which have at least one carbon-carbon double bond or carbon-carbon triple bond and have no polar group and have 2–35 carbon atoms.

As examples of such unsaturated aliphatic hydrocarbons, mention may be made of α-olefins such as ethylene, propylene, butene-1, isobutene, pentene-1, 2-methylbutene-1, hexene-1, 2-methylpentene-1, 4-methylpentene-1, heptene-1, 2-methylhexene-1, 3-methylhexene-1, 4-methylhexene-1, 5-methylhexene-1, 2-ethylpentene-1, 3-ethylpentene-1, octene-1, 2-methylheptene-1, 3-methylheptene-1, 4-methylheptene-1, 2-ethylhexene-1, 3-ethylhexene-1, 3-propylpentene-1, vinylcyclohexane, 2,3,3-trimethylpentene-1, nonene-1, 2-methyloctene-1, 3-methyloctene-1, decene-1, 2-ethyloctene-1, 4-ethyloctene-1, dodecene-1, pentadecene-1, octadecene-1, cerotene, melene, hentriacontene, and pentatriacontene, internal olefins such as butene-2, 2-methylbutene-2, pentene-2, hexene-2, octene-2, octene-3, 2,4,4-trimethylpentene-2, decene-2, decene-3, dodecene-2, dodecene-3, tetradecene-2, pentadecene-2, and octadecene-2, polyenes such as butadiene-1,3, isoprene, 2,3-dimethylbutadiene-1,3, pentadiene-1,4, cyclopentadiene, hexadiene-1,5, cyclohexadiene, hexatriene-1,3,5, 3-vinylcyclohexene, 1,7-octadiene, 1,8-nonadiene, 1,9-decadiene, 3-methyl-3-ethylpentadiene-1,4, 2,5-dimethyl-1,5-hexadiene, 1,4-dimethyl-4-t-butylheptadiene-2,6, 3,7,11-trimethyldodecatetraene-1,3, 6,10, and squalene, and acetylenes such as acetylene, pyropyne, butyne-1, butyne-2, pentyne-1, pentyne-2, hexyne-1, heptyne-1, octyne-1, and decyne-1.

The unsaturated aliphatic hydrocarbons in the present invention have no polar group, but include halogen substitution hydrocarbons and ether group-containing hydrocarbons of such polarity as substantially equal to that of hydrocarbon as the whole molecule.

Among the above unsaturated aliphatic hydrocarbons, preferred are olefins represented by the formula (I) and more preferred are α-olefins represented by the formula (II).

$$C_nH_{2n} \quad (I)$$

$$CH_2=CH-C_{n-2}H_{2n-3} \quad (II)$$

(wherein n represents an integer of 2–30).

Polyolefin resins (C) used in the present invention are homopolymers or copolymers of α-olefins such as ethylene, propylene, butene-1, pentene-1, hexene-1, 3-methylbutene-1, 4-methylpentene-1, heptene-1, octene-1, decene-1, dodecene-1, tetradecene-1, hexadecene-1, octadecene-1, and eicosene-1, but they further include copolymers of these α-olefin components and small amount of other unsaturated monomers and modified ones such as oxides, halides and sulfonates of the above homopolymers and copolymers of α-olefins and copolymers of α-olefins and other unsaturated monomers.

Examples of the other unsaturated monomers are unsaturated organic acids or derivatives thereof such as acrylic acid, methacrylic acid, maleic acid, itaconic acid, methyl acrylate, ethyl acrylate, methyl methacrylate, maleic anhydride, arylmaleinimide and alkylmaleinimide; vinyl esters such as vinyl acetate and vinyl butyrate; aromatic vinyl compounds such as styrene and methylstyrene; vinylsilanes such as vinyltrimethylmethoxysilane and γ-methaoryloyloxypropyltrimethoxysilane; and non-conjugated dienes such as dicyclopentadiene, 4-ethylidene-2-norbornane, 4-methyl-1,4-hexadiene, and 5-methyl-1,4-hexadiene.

When the polyolefin resin is a copolymer, α-olefin and other monomer may comprise two or more, respectively.

These polymers are obtained by polymerization or modification by known process and furthermore, commercially available ones may optionally be used. Naturally, these may be used in combination.

Among them, preferred are copolymers containing a predominant amount of ethylene, propylene, butene-1, 3-methylbutene-1, or 4-methylpentene-1 or homopolymers of these monomers and especially preferred are crystalline propylene polymers, namely, crystalline propylene homopolymers, and crystalline propyleneethylene block or random copolymers.

As in polyphenylene ether resin referred to hereabove, molecular weight of polyolefin resin differs in its suitable range depending on the object and cannot be simply determined, but is preferably 0.01–400 g/10 min, more preferably 0.15–60 g/10 min in terms of melt flow rate (MFR) measured under conditions of temperature of 230° C. and a load of 2.16 kg/cm².

Proportion of the polyphenylene ether resin, the unsaturated aliphatic hydrocarbon and the polyolefin resin in the resin composition of the present invention is not critical and can be optionally chosen depending on the object. However, when the composition of the present invention comprises polyphenylene ether resin and unsaturated aliphatic hydrocarbon, generally the unsaturated aliphatic hydrocarbon is 0.1–50 parts by weight, preferably 1–20 parts by weight per 100 parts by weight of the polyphenylene ether resin.

When the composition of the present invention comprises polyphenylene ether resin, unsaturated aliphatic hydrocarbon and polyolefin resin, blending ratio of polyphenylene ether resin and polyolefin resin is generally 1:99–99:1, preferably 5:95–80:20 (% by weight) based on total weight of polyphenylene ether resin and polyolefin resin. Proportion of unsaturated aliphatic hydrocarbon is 0.1–50, preferably 1–20 parts by weight per 100 parts by weight of polyphenylene ether resin used.

The composition of the present invention may contain other materials such as rubbers, other resins and inorganic fillers as far as the excellent properties of the composition are not damaged or in order to improve specific properties.

These materials include, for example, elastomers such as butyl rubber, butadiene rubber, isoprene rubber, ethylene-propylene rubber, styrenebutadiene rubber, hydrogenated and unhydrogenated styrene-conjugated diene block copolymer rubber, acrylic rubber, and silicone rubber; resins such as polystyrene, poly(meth)acrylic ester, polyester, polyacetal, polyphenylene sulfide and polyamide; inorganic fillers such as talc, mica, and calcium carbonate; fibers such as glass fiber, carbon fiber, potassium titanate fiber, and aromatic polyamide fiber; various plasticizers; various stabilizers; and radical polymerizable monomers such as styrene, acrylic acid, methyl methacrylate, acrylonitrile, and maleic anhydride. Among them, elastomers are preferably often added in order to obtain the higher impact strength.

The composition of the present invention which comprises polyphenylene ether resin and unsaturated aliphatic hydrocarbon can be produced by various known methods. Preferable methods include heat mixing in a tank type reaction vessel and melt kneading by kneader, Banbury mixer, or extruders such as single screw or twin screw extruder. It is preferred to carry out the mixing under the condition at which polyphenylene ether resin and unsaturated aliphatic hydrocarbon react at least partially to bond to each other. Such conditions can be obtained, for example, by selecting high temperatures of 100° C. or higher or by allowing to exist radical formers such as peroxides, for example, benzoyl peroxide, dicumyl peroxide, and 1,3-bis(t-butylperoxyisopropyl) benzene, diazo compounds, for example, azobisisobutyronitrile and 1,1'-azobis(cyclohexanecarbonitrile), and N-bromosuccinimide in mixing. Proportion of unsaturated compound which bonds to polyphenylene ether resin is preferably 0.1-10 parts by weight, more preferably 0.2-5 parts by weight per 100 parts by weight of polyphenylene ether resin.

The most preferred production method comprises melt kneading polyphenylene ether resin and unsaturated aliphatic hydrocarbon at a temperature of 200° C. or higher in the presence of a radical former.

The composition of the present invention which comprises polyphenylene ether resin, unsaturated aliphatic hydrocarbon and polyolefin resin can be produced by various known methods for mixing resins or mixing resin with solid or liquid additive.

Examples of preferred production method are one which comprises mixing all components by Henschel mixer, super mixer, ribbon blender or twin-cylinder mixer to obtain a uniform mixture and melt kneading the mixture by Banbury mixer, plastomill, Brabender Plastograph, or extruders such as single screw or twin screw extruder and one which comprises previously preparing a mixture of polyphenylene ether resin and unsaturated aliphatic hydrocarbon by heat mixing them in a tank type reaction vessel or by melt kneading them using the above various kneaders and then melt kneading the mixture with polyolefin resin. This melt kneading or heat mixing is preferably carried out under such conditions that polyphenylene ether resin and unsaturated aliphatic hydrocarbon react at least partially to bond to each other. Such conditions are obtained, for example, by selecting high operation temperature of 100° C. or higher or by allowing to exist radical forming agents, for example, peroxides such as benzoyl peroxide, dicumyl peroxide, di-t-butyl peroxide, cumene hydroperoxide, 2,5-dimethyl-2,5-di(peroxybenzoate)hexyn-3, 1,3-bis(t-butylperoxyisopropyl)benzene and lauroyl peroxide, diazo compounds such as azobisisobutyronitrile and 1,1'-azobis(cyclohexanecarbonitrile), and N-bromosuccinimide.

The present invention will be explained in more detail by the following nonlimiting examples.

In these examples, heat distortion temperature (which indicates heat resistance; HDT) was measured on a test piece prepared by molding using injection molding machine IS220 manufactured by Toshiba Machine Co., Ltd., under a load of 18.6 kgf/cm$^2$ in accordance with ASTM D648. Notched Izod impact strength (NI) was measured on a test piece (3.2 mm thick) prepared similarly by injection molding in accordance with ASTM D256. Intrinsic viscosity was measured in chloroform at 30° C. using Ubbelohde's viscometer.

EXAMPLES 1-6

100 parts by weight of poly(2,6-dimethyl-1,4-phenylene) ether having an intrinsic viscosity of 0.51 dl/g, each of the unsaturated aliphatic hydrocarbons as shown in Table 1 in the amount as shown in Table 1 and 0.1 part by weight of dicumyl peroxide were mixed by Henschel mixer. The resulting mixture was melt kneaded by a twin screw extruder provided with vacuum venting function (TEM-50 manufactured by Toshiba Machine Co., Ltd.) at 300° C. to obtain pellets of polyphenylene ether resin composition. HDT and NI of the pellets are shown in Table 1.

COMPARATIVE EXAMPLE 1

Polyphenylene ether resin composition was obtained in the same manner as in Example 1 except that unsaturated aliphatic hydrocarbon and dicumyl peroxide were not used. HDT and NI of the resulting pellets are shown in Table 1.

TABLE 1

| | Unsaturated aliphatic hydrocarbon | | HDT (°C.) | NI (kg · cm/cm) |
|---|---|---|---|---|
| | Identity | Amount (part by weight) | | |
| Example 1 | Octene-1 | 5 | 182 | 4.8 |
| Example 2 | Decene-1 | 5 | 181 | 5.2 |
| Example 3 | Dodecene-1 | 5 | 181 | 6.0 |
| Example 4 | Octadecene-1 | 5 | 177 | 6.4 |
| Example 5 | Octadecene-1 | 1 | 180 | 5.0 |
| Example 6 | Octadecene-1 | 10 | 174 | 5.5 |
| Comparative Example 1 | — | — | 183 | 3.5 |

(Note): Poly(2,6-dimethyl-1,4-phenylene) ether having an intrinsic viscosity of 0.51 dl/g in an amount of 100 parts by weight was used as polyphenylene ether resin.

EXAMPLES 7-11 AND COMPARATIVE EXAMPLE 2

30 parts by weight of poly(2,6-dimethyl-1,4-phenylene) ether having an intrinsic viscosity of 0.27 dl/g, 70 parts by weight of polypropylene (SUMITOMO NOBRENE D501 manufactured by Sumitomo Chemical Co., Ltd ) having an MFR of 0.4 g/10 min, 0.1 part by weight of 1,3-bis(t-butylperoxyisopropyl) benzene, and rubber as shown in Table 2 and unsaturated aliphatic hydrocarbons as shown in Table 2 in the amounts as shown in Table 2 were mixed by a super mixer. The resulting mixture was melt kneaded using a twin screw extruder provided with an intermediate feed opening and a vent opening (TEM-50 manufactured by Toshiba Machine Co., Ltd.) at a cylinder temperature of 260° C. to obtain pellets of resin composition NI of the pellets is shown in Table 2.

TABLE 2

|  | Rubber | | Unsaturated aliphatic hydrocarbon | | NI (kg · cm/cm) |
|---|---|---|---|---|---|
|  | Identity | Part by weight | Identity | Part by weight |  |
| Example 7 | — | — | Decene-1 | 2 | 3.0 |
| Example 8 | — | — | Decene-1 | 10 | 4.8 |
| Example 9 | — | — | Octa-decene-1 | 10 | 5.1 |
| Example 10 | EPR[a] | 25 | Decene-1 | 5 | 25 |
| Example 11 | SEP[b] | 20 | Decene-1 | 5 | 32 |
| Comparative Example 2 | — | — | — | — | 0.9 |

[a] Ethylene-propylene rubber (propylene content: 27 wt %; Mooney viscosity at 121° C.: 33)
[b] Partially hydrogenated styrene-isoprene block copolymer (KRATON G-1701 manufactured by Shell Chemical Co.)

EXAMPLE 12

Pellets of resin composition were obtained by melt kneading in the same manner as in Example 7 except that 1 part by weight of styrene was further added. NI of the pellets was 5.2 kg/.cm/cm.

Utilizing its excellent heat resistance and impact strength, the thus obtained resin composition of the present invention which comprises a polyphenylene ether resin and an unsaturated aliphatic hydrocarbon is molded by various methods such as extrusion molding and injection molding and thus can be practically used as resin molded articles and besides it is useful as raw material for polymer alloys with other thermoplastic resins. Thus, the composition has remarkable industrial values.

Furthermore, utilizing the excellent impact strength and economical merit, the resin composition of the present invention which comprises a polyphenylene ether resin, an unsaturated aliphatic hydrocarbon and a polyolefin resin is molded by various methods such as extrusion molding and injection molding and the molded articles are supplied to the world. Thus, the industrial value is remarkable.

What is claimed is:

1. A process for preparing a resin composition which comprises melt kneading (a) a polyphenylene ether and (b) an olefin represented by the following formula (I):

$$C_nH_{2n} \qquad (I)$$

wherein n is an integer of 10–30.

2. A resin composition obtained by melt-kneading (a) a polyphenylene ether and (b) an olefin represented by the following formula (I):

$$C_nH_{2n} \qquad (I)$$

wherein n is an integer of 10–30.

* * * * *